United States Patent
Mukherjee et al.

(10) Patent No.: US 11,939,948 B2
(45) Date of Patent: Mar. 26, 2024

(54) BLADE SHELL SECTION AND A WIND TURBINE BLADE COMPRISING A BLADE SHELL SECTION

(71) Applicants: LM WIND POWER A/S, Kolding (DK); LM WIND POWER R&D (HOLLAND) B.V., Heerhugowaard (NL); BLADE DYNAMICS LIMITED, Eastleigh (GB)

(72) Inventors: Manish Mukherjee, Eastleigh (GB); Laszlo Bartha, Heerhugowaard (NL); Aydin Raeis Hosseiny, Kolding (DK); Sigmund Wenningsted, Kolding (DK)

(73) Assignees: LM WIND POWER A/S, Kolding (DK); LM WIND POWER R&D (HOLLAND) B.V., Heerhugowaard (NL); BLADE DYNAMICS LIMITED, Eastleigh (GB)

(*) Notice: Subject to any disclaimer, the term of this patent is extended or adjusted under 35 U.S.C. 154(b) by 0 days.

(21) Appl. No.: 17/924,675

(22) PCT Filed: May 11, 2021

(86) PCT No.: PCT/EP2021/062468
§ 371 (c)(1),
(2) Date: Nov. 10, 2022

(87) PCT Pub. No.: WO2021/228848
PCT Pub. Date: Nov. 18, 2021

(65) Prior Publication Data
US 2023/0175477 A1 Jun. 8, 2023

(30) Foreign Application Priority Data
May 11, 2020 (GB) ...................................... 2006893

(51) Int. Cl.
F03D 1/06 (2006.01)

(52) U.S. Cl.
CPC ........... F03D 1/0675 (2013.01); F03D 1/069 (2023.08); F05B 2240/304 (2020.08);
(Continued)

(58) Field of Classification Search
CPC .................................. F03D 1/067; F03D 1/069
See application file for complete search history.

(56) References Cited

U.S. PATENT DOCUMENTS 10,821,696 B2 * 11/2020 Roberts ................. B29C 70/682
2019/0291365 A1 9/2019 Roberts et al.
(Continued)

FOREIGN PATENT DOCUMENTS

CN 104696167 A 6/2015
DE 10 2017 004 058 A1 10/2018
(Continued)

*Primary Examiner* — Justin D Seabe
*Assistant Examiner* — John S Hunter, Jr.
(74) *Attorney, Agent, or Firm* — Nath, Goldberg & Meyer; Jerald L. Meyer

(57) ABSTRACT

Disclosed is a blade shell section of a wind turbine blade, such as wind turbine blade with a flatback section. The blade shell section extends in a longitudinal direction from a first shell section position to a second shell section position. The blade shell section comprises a first laminate layer forming the outer surface of the blade shell section and a second laminate layer forming the inner surface of the blade shell section. The blade shell section further comprising a first shell section and a corner shell section between the contour shell section and the flatback shell section.

16 Claims, 6 Drawing Sheets

(52) U.S. Cl.
CPC ... *F05B 2250/711* (2013.01); *F05B 2250/712* (2013.01); *F05B 2280/4003* (2013.01)

(56) References Cited

U.S. PATENT DOCUMENTS

| | | | |
|---|---|---|---|
| 2021/0270232 A1* | 9/2021 | Hoffmann | F03D 1/0675 |
| 2022/0145850 A1* | 5/2022 | Nielsen | B29D 99/0028 |
| 2022/0178347 A1* | 6/2022 | Mukherjee | B29C 66/12445 |

FOREIGN PATENT DOCUMENTS

| | | |
|---|---|---|
| EP | 2204577 A2 | 12/2009 |
| EP | 2402594 A1 | 1/2012 |
| EP | 2901010 | 4/2014 |
| WO | 2018/015250 A1 | 1/2018 |

\* cited by examiner

BLADE SHELL SECTION AND A WIND TURBINE BLADE COMPRISING A BLADE SHELL SECTION

This is a National Phase Application filed under 35 U.S.C. 371 as a national stage of PCT/EP2021/062468, filed May 11, 2021, an application claiming the benefit of Great Britain Application No. 2006893.8, filed May 11, 2020, the content of each of which is hereby incorporated by reference in its entirety.

FIELD OF INVENTION

The present disclosure relates to a blade shell section of a fibre reinforced polymer composite structure, such as a wind turbine blade, and in particular a wind turbine blade with trailing edge formed as a flatback.

BACKGROUND

Wind turbine blades of fibre-reinforced polymer and in particular the aerodynamic shells of wind turbine blades are usually manufactured in moulds, where the pressure side and the suction side of the blade are manufactured separately by arranging glass fibre mats and/or other fibre-reinforcement material, such as carbon fibre, in each of the two moulds. Afterwards, one of the two halves is turned upside down and positioned on top of the other of the two halves, and the two halves are adhered together. The blade parts may be positioned on top of each other by turning and repositioning the complete half mould.

A wind turbine blade may be manufactured by infusing fibres, such as glass fibre mats and/or carbon fibre mats with a resin, such as polyester or epoxy. Infusion of the fibres may be provided by vacuum assisted resin transfer moulding (VARTM).

As wind turbines and wind turbine blades increase in size, the blade loads, i.e. strains, bending moments, peel loads etc., in particular along the trailing edge, increase. For this and other reasons, the design of the trailing edge is an important factor for the efficiency of the wind turbine. Wind turbine blades comprising a flatback profile at the trailing edge may have an increased efficiency. An optimized profile comprises a varying geometry of the trailing edge along the airfoil region of the blade.

However, it may be complicated to assemble a wind turbine blade with a flatback trailing edge. In particular, it may be challenging to sufficiently bond together trailing edge interfaces between the pressure side and suction side blade shell when the blade comprises a flatback profile.

The present disclosure relates to a fibre reinforced polymer composite structure such as a wind turbine blade comprising a shell structure comprising a shell core arranged between an outer laminate layer and an inner laminate layer. When using a traditional core made of balsa wood or foamed polymer material, it is impossible or challenging to provide a sharp corner, as traditional cores cannot be bent to provide a sharp corner. For obtaining a sharp corner, a separate loose corner element can be used. However, such separate loose corner elements tend to slip relative to the core and to not be maintained in the intended position relative to the core.

The use of traditional cores is especially challenging in the manufacturing of large structures such as wind turbine blades.

The problem is known from the manufacturing of wind turbine blades having a flat back section of the trailing edge and where it is desirable to provide a sharp corner between the flat back section of the trailing edge and the suction side and/or the pressure side of the wind turbine blade.

SUMMARY OF THE INVENTION

It is an object of the present disclosure to provide a blade shell section and a wind turbine blade which overcomes at least some of the disadvantages of the prior art.

In particular, it is an object of the present invention to provide a blade shell section for a wind turbine blade, which accommodates the complex geometry of flatback wind turbine blades. By accommodating the complex geometry and shape of a flatback trailing edge of a wind turbine blade, reduction in factory footprint and reduced transportation cost is obtained by the reduced chord of the blade. Furthermore, the flatback wind turbine blade improves the energy production.

Thus, the present invention relates to a blade shell section of a wind turbine blade, such as wind turbine blade with a flatback section.

The blade shell section may form part of a blade shell part. The blade shell part may be one of the two halves forming a wind turbine blade. The blade shell part may be a first shell part, such as a pressure side shell part. The blade shell part may be a second shell part, such as a suction side shell part.

The blade shell section extends in a longitudinal direction from a first shell section position to a second shell section position. The blade shell section comprises a first laminate layer forming the outer surface of the blade shell section and a second laminate layer forming the inner surface of the blade shell section.

The blade shell section further comprises a first shell section, e.g. a flatback shell section or a profiled contour shell section. The first shell section comprises a first core element having a first primary core surface and a first secondary core surface opposite the first core surface, a first primary core lateral face between the first primary core surface and the first secondary core surface and a first secondary core lateral face between the first primary and first secondary core surface laterally spaced from and opposite the first primary core lateral face.

The blade shell section comprises a second shell section. The blade shell section further comprises a corner shell section between the first shell section and the second shell section. The corner shell section comprises a corner core element being an elongated element extending in a longitudinal direction between a first longitudinal end and a second longitudinal end. The corner core element has a first corner main surface and a second corner main surface opposite the first corner main surface. The corner core element has a first corner end face and a second corner end face opposite the first corner end face. The corner core element has a first corner lateral face between the first and the second corner main surface and a second corner lateral face between the first and second corner main surface laterally spaced from and opposite the first corner lateral face. The first corner lateral face has a first corner lateral face height. The second corner lateral face has a second corner lateral face height. The corner core element and the first core element are arranged such that the first corner lateral face abuts the first secondary core lateral face.

It is an advantage of the present disclosure that thicker profiles may be provided in flatback wind turbine blades. Furthermore, the corner core element provides a corner geometry which reduces wrinkle formation during layup of the laminate layers.

The first corner lateral face and the first secondary core lateral face may abut against each other.

The first corner lateral face and the first secondary core lateral face may abut such that the first corner lateral face and the first secondary core lateral face extend substantially parallel, e.g., the normal of each of the first corner lateral face and the first secondary core lateral face are parallel.

The first corner lateral face and the first secondary core lateral face may abut such that the first corner lateral face and the first secondary core lateral face fit tightly against each other.

The first shell section and/or the second shell section and/or the corner shell section may be sandwiched between the first laminate layer and the second laminate layer.

The first laminate layer may cover the first primary core surface and/or the second corner main surface and/or the second primary core surface. The second laminate layer may cover the first secondary core surface and/or the first corner main surface and/or the second secondary core surface.

The first main surface may have a concave shape. The second main surface may have a convex shape.

The second corner main surface may have a first radius of curvature at a first position, e.g. a first longitudinal position, proximate the first longitudinal end.

The second corner main surface may have a second radius of curvature at a second position, e.g. a second longitudinal position, proximate the second longitudinal end. The first radius of curvature may be larger than the second radius of curvature.

It is a further advantage of the present disclosure that a corner with a varying radius of curvature may be provided in order to accommodate the changing geometry and thickness of the shell of the flatback section. The first position and the second position may be located between the first longitudinal end and the second longitudinal end. The radius of curvature may decrease from the first radius of curvature r1 to the second radius of curvature r2. The radii of curvature may describe the curvature of part of the second corner main surface, such as only the curvature at the centre of the surface. The first corner main surface may have different radii of curvature than the second corner main surface at corresponding longitudinal positions, e.g. the radii of curvatures of the first corner main surface may be larger than the radii of curvatures for the second corner main surface. The first corner main surface and the second corner main surface may have a twisted or curved shape, e.g. to accommodate the twisted/curved shape of a wind turbine blade.

The blade shell section may comprise a second core element having a second primary core surface and a second secondary core surface opposite the second core surface, a second primary core lateral face between the second primary core surface and the second secondary core surface and a second secondary core lateral face between the second primary and second secondary core surface laterally spaced from and opposite the second primary core lateral face. The corner core element and the second core element may be arranged such that the second corner lateral face abuts the second primary core lateral face.

The first corner lateral face height may be smaller than the second corner lateral face height. The first corner lateral face height may be larger than the second corner lateral face height. The first corner lateral face height and the second corner lateral face height may be the same.

The corner core element and/or the first core element and/or the second core element may be made of a core material, e.g. a lightweight core material, such as an expanded polymer foam material or balsa wood. In the case where the material of the corner core element and the core elements are different, the materials should have similar properties in terms of stiffness, density and strength.

The first core element and the second core element may be fixated to the corner core element. Fixating the first core element and the second core element to the corner core element may comprise fixating mechanically, e.g. by providing plastic staples linking the corner core element and the core elements. Fixating the first core element and the second core element to the corner core element may comprise fixating chemically, e.g. by applying an adhesive between the corner core element and the core elements. Alternatively, an adhesive tape may be applied across the transition from one element to another.

It is a further advantage of the present disclosure that the corner core element may provide for a transition between different thicknesses of the first core element and the second core element.

The first shell section may form part of a profiled contour shell section. The first core element may form part of a profiled contour shell section. The second shell section may form part of a flatback shell section. The second core element may form part of a flatback shell section. Alternatively, the first core element may form part of a flatback shell section and the second core element may form part of a profiled contour shell section.

The first corner lateral face height of the first corner lateral face may be between 5-100 mm, such as between 45-55 mm, such as around 50 mm.

The second corner lateral face height of the second corner lateral face may be between 5-100 mm, such as around 10 mm.

The blade shell section may comprise a plurality of corner core parts arranged in series in the longitudinal direction of the corner core element.

The first corner main surface of the corner core element may be flush with the first primary core surface of the first core element and a second primary core surface of the second core element. The second corner main surface of the corner core element may be flush with a first secondary core surface of the first core element and a second secondary core surface of the second core element.

The first shell section and/or the second shell section and/or the corner shell section may be sandwiched between the first laminate layer and the second laminate layer.

Also disclosed is a blade shell part comprising a blade shell section, such as the above described blade shell section. The blade shell part extends from a root end to a tip end along a longitudinal axis and comprises a root region, a transition region and an airfoil region. The blade shell part comprises a sandwich structure comprising an inner laminate, a core and an outer laminate. The distance between the first shell section end and the second shell section end constitutes 20-60% of the length of the blade shell part, such as 35-45% of the length for the blade shell part, such as 40% of the length of the blade shell part. The blade shell section is arranged proximate the root region of the blade shell part. For example, the blade shell section may extend from the root end towards the tip end, or the blade shell section may extend from the root region towards the tip end, or the blade shell section may extend from the transition region towards the tip end, or the blade shell section may extend from the end of the airfoil region proximate the root end and towards the tip end.

The blade shell section may be arranged such that the first longitudinal end is proximate the root end of the blade shell part and the second longitudinal end is proximate the tip end of the blade shell part.

Also disclosed is a wind turbine blade extending from a root end to a tip end along a longitudinal axis and comprising a root region, a transition region and an airfoil region. The wind turbine blade comprises a sandwich structure comprising an inner laminate, a core and an outer laminate. The wind turbine blade further comprises a first blade shell part, such as a pressure side shell part. The wind turbine blade further comprises a second blade shell part, such as a suction side shell part. The first and second blade shell parts are joined along a leading edge joint and along a trailing edge joint. The first blade shell part or the second blade shell part comprises a blade shell section, such as the above described blade shell section.

The distance between the first shell section end and the second shell section end may constitute 20-60% of the length of the wind turbine blade, such as 35-45% of the length of the wind turbine blade, such as 40% of the length of the wind turbine blade. The blade shell section may be arranged proximate the root region of the wind turbine blade. For example, the blade shell section may extend from the root end towards the tip end, or the blade shell section may extend from the root region towards the tip end, or the blade shell section may extend from the transition region towards the tip end, or the blade shell section may extend from the end of the airfoil region proximate the root end and towards the tip end.

The blade shell section may be arranged such that the first longitudinal end is proximate the root end of the wind turbine blade and the second longitudinal end is proximate the tip end of the wind turbine blade.

It is envisaged that any embodiments or elements as described in connection with any one aspect may be used with any other aspects or embodiments, mutatis mutandis.

BRIEF DESCRIPTION OF THE FIGURES

Embodiments of the invention will be described in more detail in the following with regard to the accompanying figures, Like reference numerals refer to like elements throughout. Like elements may, thus, not be described in detail with respect to the description of each figure. The figures show one way of implementing the present invention and are not to be construed as being limiting to other possible embodiments failing within the scope of the attached claim set. In addition, an illustrated embodiment needs not have all the aspects or advantages shown. An aspect or an advantage described in conjunction with a particular embodiment is not necessarily limited to that embodiment and can be practiced in any other embodiment even if not so illustrated, or if not so explicitly described.

DETAILED DESCRIPTION

Figure 1:
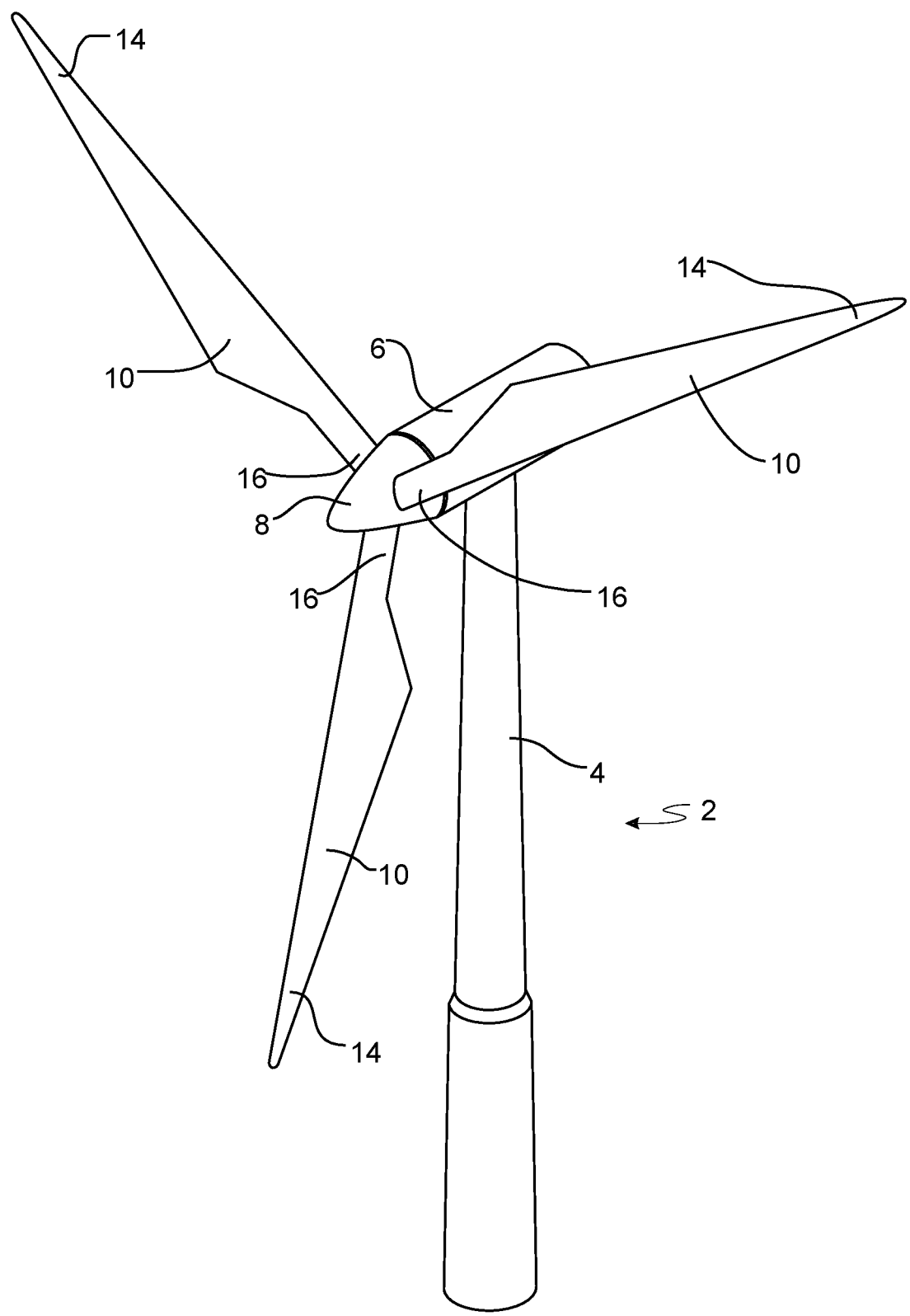
FIG. 1 is a schematic diagram illustrating an exemplary wind turbine.

In the following figure description, the same reference numbers refer to the same elements and may thus not be described in relation to all figures, FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8.

Figure 2:
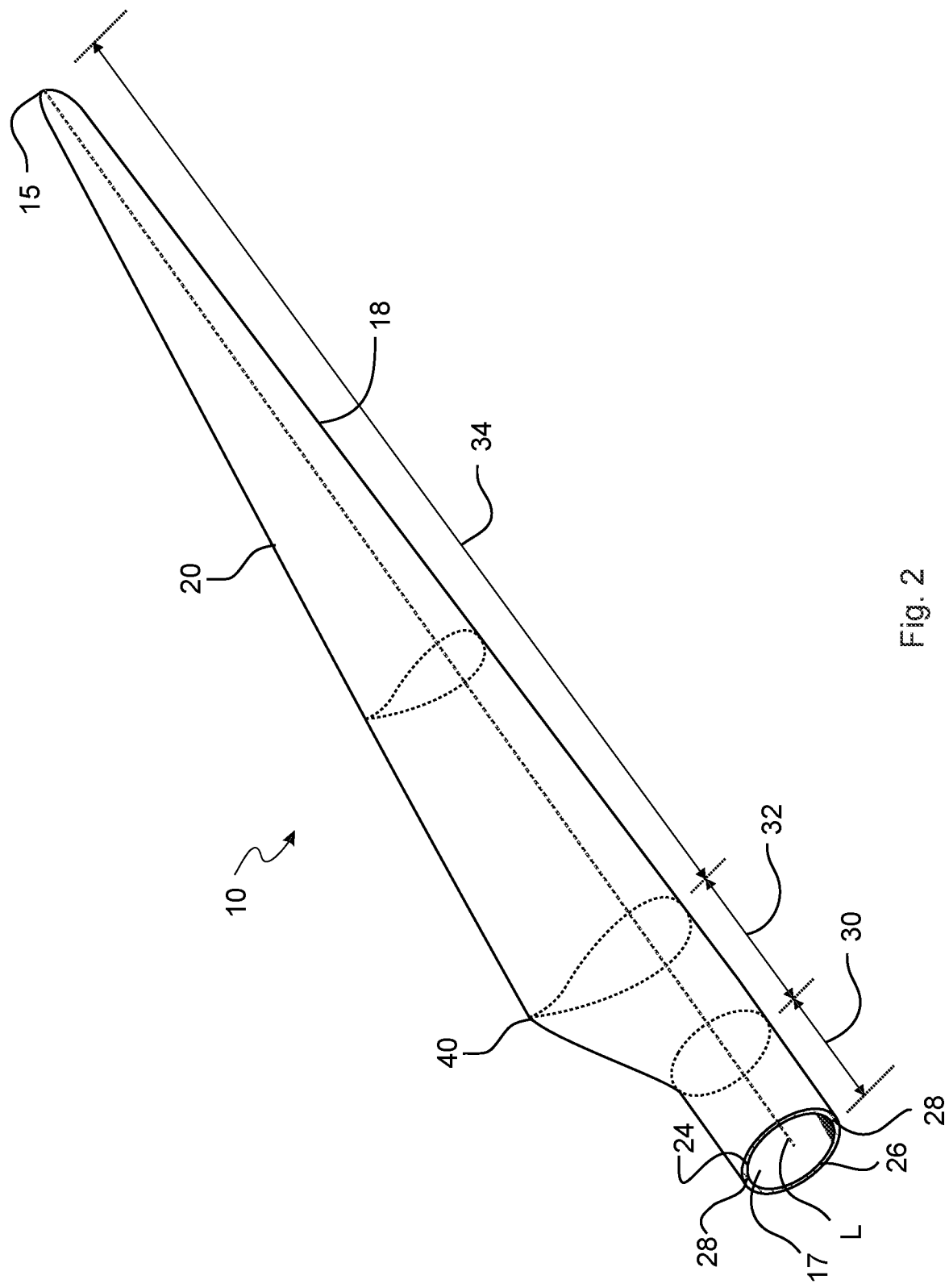
FIG. 2 is a schematic diagram illustrating an exemplary wind turbine blade.

FIG. 2 shows a schematic view of an exemplary wind turbine blade 10. The wind turbine blade 10 has the shape of a conventional wind turbine blade with a root end 17 and a tip end 15 and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a blade shell comprising two blade shell parts or half shells, a first blade shell part 24 and a second blade shell part 26, typically made of fibre-reinforced polymer. The wind turbine blade 10 may comprise additional shell parts, such as a third shell part and/or a fourth shell part. The first blade shell part 24 is typically a pressure side or upwind blade shell part. The second blade shell part 26 is typically a suction side or downwind blade shell part. The first blade shell part 24 and the second blade shell part 26 are fastened together with adhesive, such as glue, along bond lines or glue joints 28 extending along the trailing edge 20 and the leading edge 18 of the blade 10. Typically, the root ends of the blade shell parts 24, 26 have a semi-circular or semi-oval outer cross-sectional shape.

Figure 3:
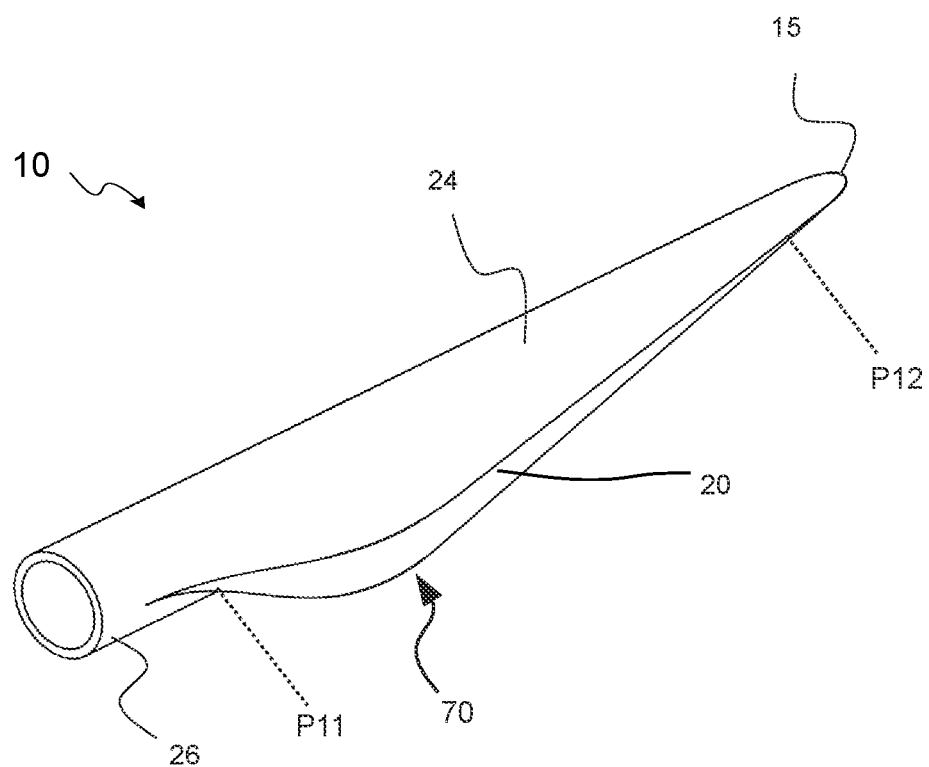
FIG. 3 is a schematic diagram illustrating an exemplary wind turbine blade.

FIG. 3 shows a wind turbine blade 10 with a flatback profile at the trailing edge 20. The trailing edge 20 has a flattened profile. The flattened profile may increase the aerodynamic efficiency and also may reduce the chord width, thereby making it easier to transport the wind turbine blade 10. Furthermore, it also may reduce required manufacturing space. The flatback profile comprises a blade shell section 70 as part of the second blade shell part 26. Alternatively, the blade shell section 70 may be part of the first blade shell part 24. The blade shell section 70 extends in a longitudinal direction from a first shell section position P11 to a second shell section position P12. The distance between the first shell section position P11 and the second shell section position P12 may constitute 20-60% of the length of the blade shell part 26. The blade shell section 70 is arranged proximate the root region of the blade shell part 26.

Figure 4:
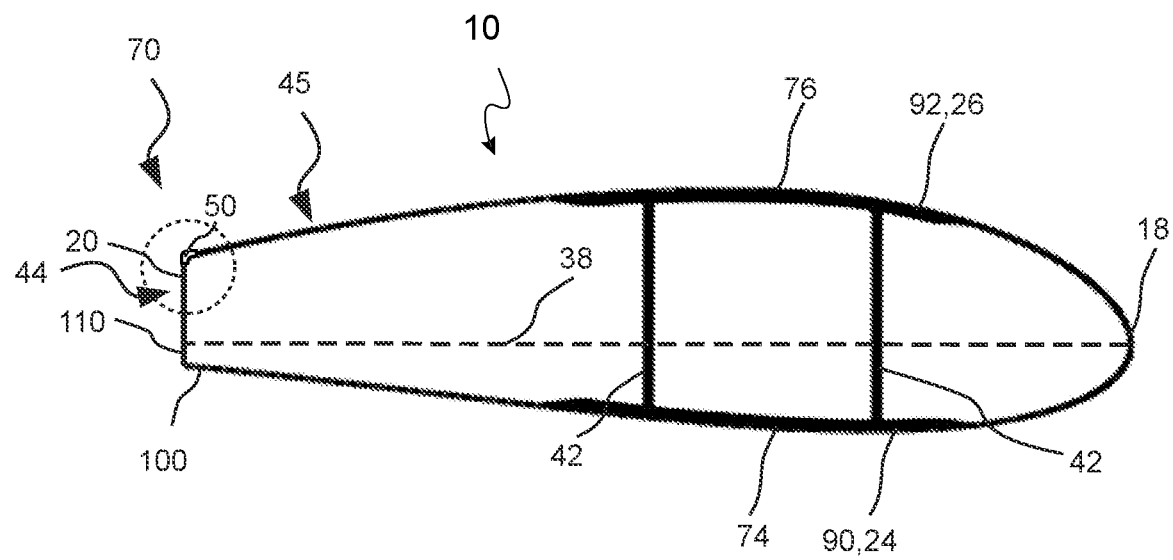
FIG. 4 is a schematic diagram illustrating an exemplary wind turbine blade.

FIG. 4 is a schematic diagram illustrating a cross sectional view of an exemplary wind turbine blade 10, e.g. a cross sectional view of the airfoil region of the wind turbine blade 10 as described in relation to FIG. 3. The wind turbine blade 10 comprises a leading edge 18, a trailing edge 20, a pressure side 24, a suction side 26 a first spar cap 74, and a second spar cap 76. The trailing edge 20 has a flattened profile for forming a flatback profile. The wind turbine blade 10 comprises a chord line 38 between the leading edge 18 and the trailing edge 20. The wind turbine blade 10 comprises shear webs 42, such as a leading edge shear web and a trailing edge shear web. The shear webs 42 could alternatively be a spar box with spar sides, such as a trailing edge spar side and a leading edge spar side. The spar caps 74, 76 may comprise carbon fibres, e.g. in combination with glass fibres, while the rest of the shell parts 24, 26 may comprise glass fibres.

The wind turbine blade 10, such as the shell parts 24, 26 may comprise sandwich panels, e.g. comprising lightweight materials such as balsa or foam sandwiched between fibre-reinforced layers. The trailing edge 20 forming the flattened profile may be provided as a third shell part, or as an integral part of the first shell part 24 or the second shell part 26. Alternatively, the trailing edge 20 may be provided by parts of both the first shell part 24 and the second shell part 26. A corner core element 50 is arranged in the second blade shell section 70, e.g. in the joint between the flatback shell section 44 and the profiled contour shell section 45.

A glue joint for assembling the first shell part 24 and the second shell part 26 may be provided near the trailing edge 20, such as between a first trailing edge part of the trailing edge 20 and a second trailing edge part of the trailing edge 20. Alternatively, the glue flange may be provided between the trailing edge 20 and the first shell part 24 or between the trailing edge 20 and the second shell part 26.

In the example described with respect to the following figures, a glue joint between the trailing edge 20 (forming part of the second shell part 26) and the first shell part 24 is described. The first shell part 24 constitutes a first blade component 90 and the second shell part 26 constitutes a second blade component 92 including the trailing edge 20. The first blade component 90 comprises a first contact area 100 configured to be connected to a second contact area 110 of the second blade component 92. The second contact area 110 may form part of the trailing edge 20. In an alternative, non-illustrated, example, the first contact area 100 forms part of the trailing edge 20.

Figure 5:
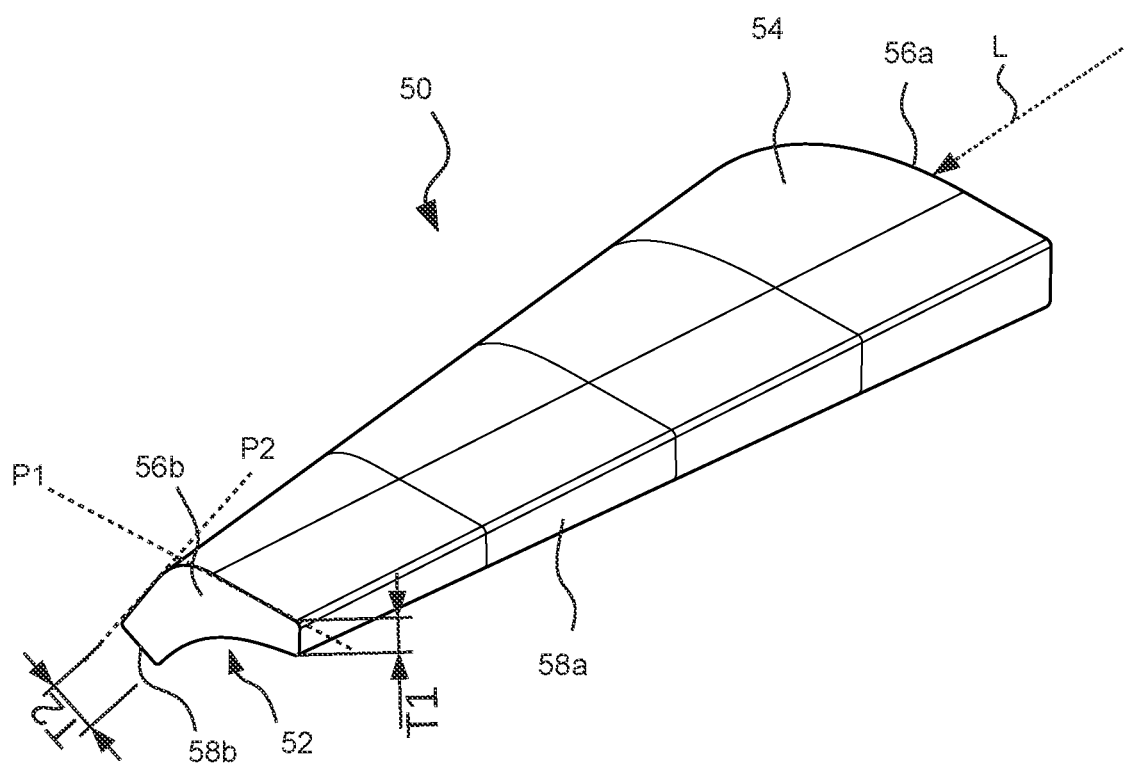
FIG. 5 is a schematic diagram illustrating an exemplary corner core element.

FIG. 5 is a schematic diagram illustrating an exemplary corner core element 50, such as the corner core element 50 of FIG. 3-4. The corner core element 50 extends in a longitudinal direction from a first longitudinal end 56a to a second longitudinal end 56b. The corner core element 50 has a first corner main surface 52 and an opposite second corner main surface 54. The corner core element 50 has a first corner lateral face 58a between the first and the second corner main surface and a second corner lateral face 58b between the first corner main surface 52 and second corner main surface 54 laterally spaced from and opposite the first corner lateral face 58a. The first corner lateral face 58a has a first corner lateral face height T1 at a first position P1. The second corner lateral face 58b has a second corner lateral face height T2 at a second position P2. The first corner lateral face height T1 may be smaller than the second corner lateral face height T2. The first position P1 and the second position P2 may have the same longitudinal position on the corner core element 50. The first position P1 and the second position P2 are located between the first longitudinal end 56a and the second longitudinal end 56b on the longitudinal axis L. The corner core element 50 is made of a core material, such as an expanded polymer foam or balsa wood. The second corner main surface 54 has a convex shape.

Figure 6:
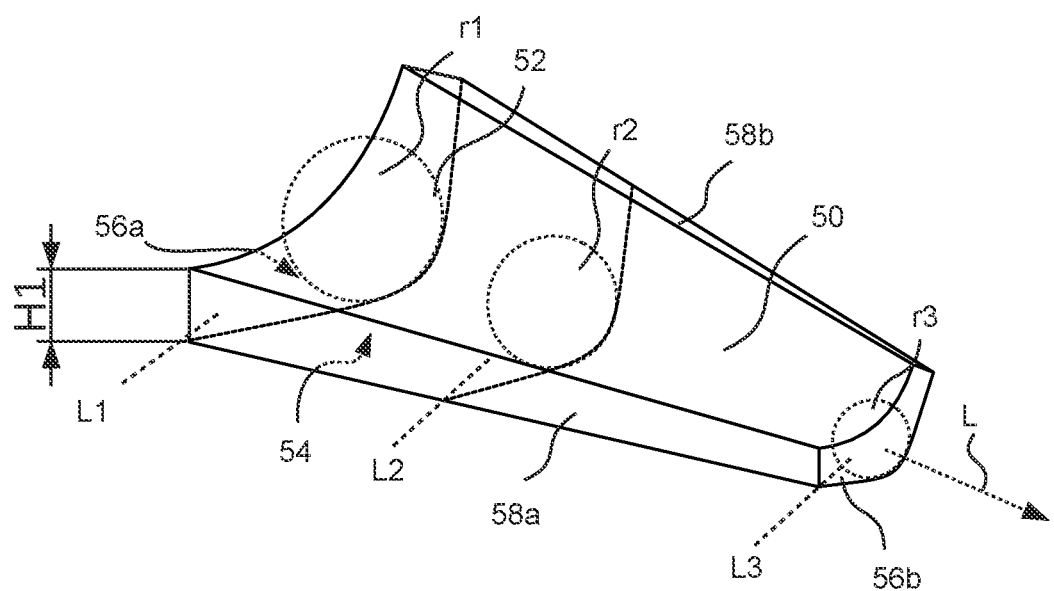
FIG. 6 is a schematic diagram illustrating an exemplary corner core element.

FIG. 6 is a schematic diagram illustrating an exemplary corner core element 50, such as the corner core element 50 of the previous figures. The second corner main surface 54 of the corner core element 50 has a first radius of curvature r1 at a first longitudinal position L1, a second radius of curvature r2 at a second longitudinal position L2 and a third radius of curvature r3 at a third longitudinal position L3. The first radius of curvature may be around 200 mm. The third radius of curvature may be around 50 mm. The first longitudinal position L1, second longitudinal position L2 and third longitudinal position L3 are located between the first longitudinal end 56a and the second longitudinal end 56b on the longitudinal axis L. The first longitudinal position L1 may be at the first longitudinal end 56a, the third longitudinal position L3 may be at the second longitudinal end 56b and the second longitudinal position L2 may be at a position between the first longitudinal position L1 and the third longitudinal position L3. The radius of curvature may decrease from the first radius of curvature r1 to the second radius of curvature r2 and/or the third radius of curvature r3.

The width of the corner core element 50 between the first corner lateral face 58a and the second corner lateral face 58b may decrease from the first longitudinal end 56a to the second longitudinal end 56b. The radii of curvature r1, r2 and r3 may describe the curvature of part of the second corner main surface 54, such as only the curvature at the centre of the surface. The first corner main surface 52 has a concave shape. The first corner main surface 52 may have different radii of curvature than the second corner main surface 54 at corresponding positions on the longitudinal axis L, e.g. the first corner main surface may have larger radii of curvatures. The first corner main surface 52 and the second corner main surface 54 may have a twisted shape, e.g. to follow the twisted shape of a wind turbine blade.

Figure 7:
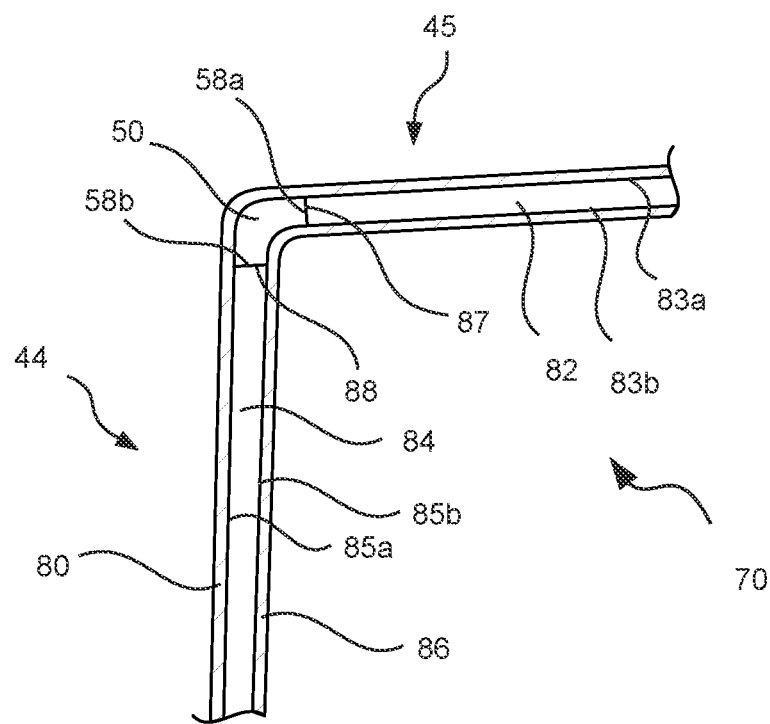
FIG. 7 is a schematic diagram illustrating an exemplary blade shell section of a wind turbine blade.

FIG. 7 is a schematic diagram illustrating an exemplary blade shell section 70 of a wind turbine blade, such as a blade shell section 70 of the wind turbine blade 10 of FIGS. 3-4. The blade shell section 70 comprises a first laminate layer 80, a core layer comprising a first core element 82, a corner core element 50 and a second core element 84, and a second laminate layer 86.

The first core element 82 has a first primary core surface 83a and a first secondary core surface 83b opposite the first primary core surface 83*a*, a first primary core lateral face (not shown) between the first primary core surface 83*a* and the first secondary core surface 83*b* and a first secondary core lateral face 87 between the first primary core surface 83*a* and first secondary core surface 83*b*. The corner core element 50 and the first core element 82 are arranged such that the first corner lateral face 58*a* abuts the first secondary core lateral face 87.

The second core element 84 has a second primary core surface 85*a* and a second secondary core surface 85*b* opposite the second primary core surface 85*a*, a second primary core lateral face 88 between the second primary core surface 85*a* and the second secondary core surface 85*b* and a second secondary core lateral face (not shown) between the second primary core surface 85*a* and second secondary core surface 85*b*. The corner core element 50 and the second core element 84 are arranged such that the second corner lateral face 58*b* abuts the second primary core lateral face 88.

The first laminate layer 80, the core layer and the second laminate layer 86 may be consolidated, e.g. by infusing resin with vacuum assisted resin transfer moulding (VARTM). The blade shell section 70 may be manufactured as a part of a blade shell part 24, 26 in a mould.

The first core element 82, the corner core element 50 and the second core element 84 may be of a core material, such as a lightweight material of expanded polymer foam or balsa wood. In the case where the material of the corner core element 50 and the core elements 82, 84 are different, the materials should have similar properties in terms of stiffness, density and strength.

The first core element 82 and the second core element 84 may be fixated to the corner core element 50. They may be fixated mechanically, e.g. by providing plastic staples linking the corner core element 50 and the core elements 82, 84. Alternatively, they may be fixated chemically, e.g. by applying an adhesive between the corner core element 50 and the core elements 82, 84 or an adhesive tape may be applied across the transition from one element to another.

Although not illustrated, the blade shell section 70 may comprise only one core element, such as only a core element in the profiled contour shell section 45 or only a core element in the flatback shell section 44. In the case where the blade shell section only comprises one core element, the first or second corner lateral face corner core element may be tapered. Alternatively, the first corner lateral face 58*a* and/or the second corner lateral face 58*b* and the first corner main surface 52 may constitute the same surface.

Figure 8:
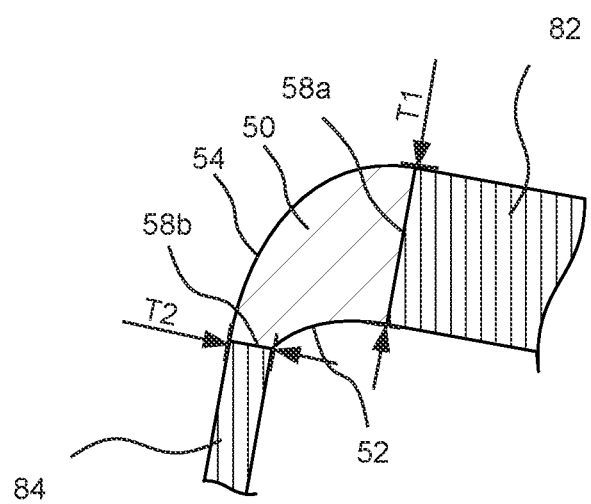
FIG. 8 is a schematic diagram illustrating an exemplary part of a blade shell section.

FIG. 8 is a schematic diagram illustrating a part of a blade shell section 70, such as part of the blade shell section 70 of FIG. 7. FIG. 8 is a cross section taken at e.g. the first longitudinal end 56*a*, the second longitudinal end 56*b*, or a position between the first longitudinal end 56*a* and the second longitudinal end 56*b* along the longitudinal axis L. The first corner lateral face 58*a* has a first corner lateral face height T1 between the first corner main surface 52 and the second corner main surface 54. The second corner lateral face 58*b* has a second corner lateral face height T2 between the first corner main surface 52 and the second corner main surface 54. The first corner lateral face height T1 may be larger than the second corner lateral face height T2. The first corner lateral face height T1 may correspond to the thickness of the first core element 82 and the second corner lateral face height T2 may correspond to the thickness of the second core element 84, such that the transition from the corner core element 50 to the first core element 82 and the second core element 84 is smooth.

Figure 9:
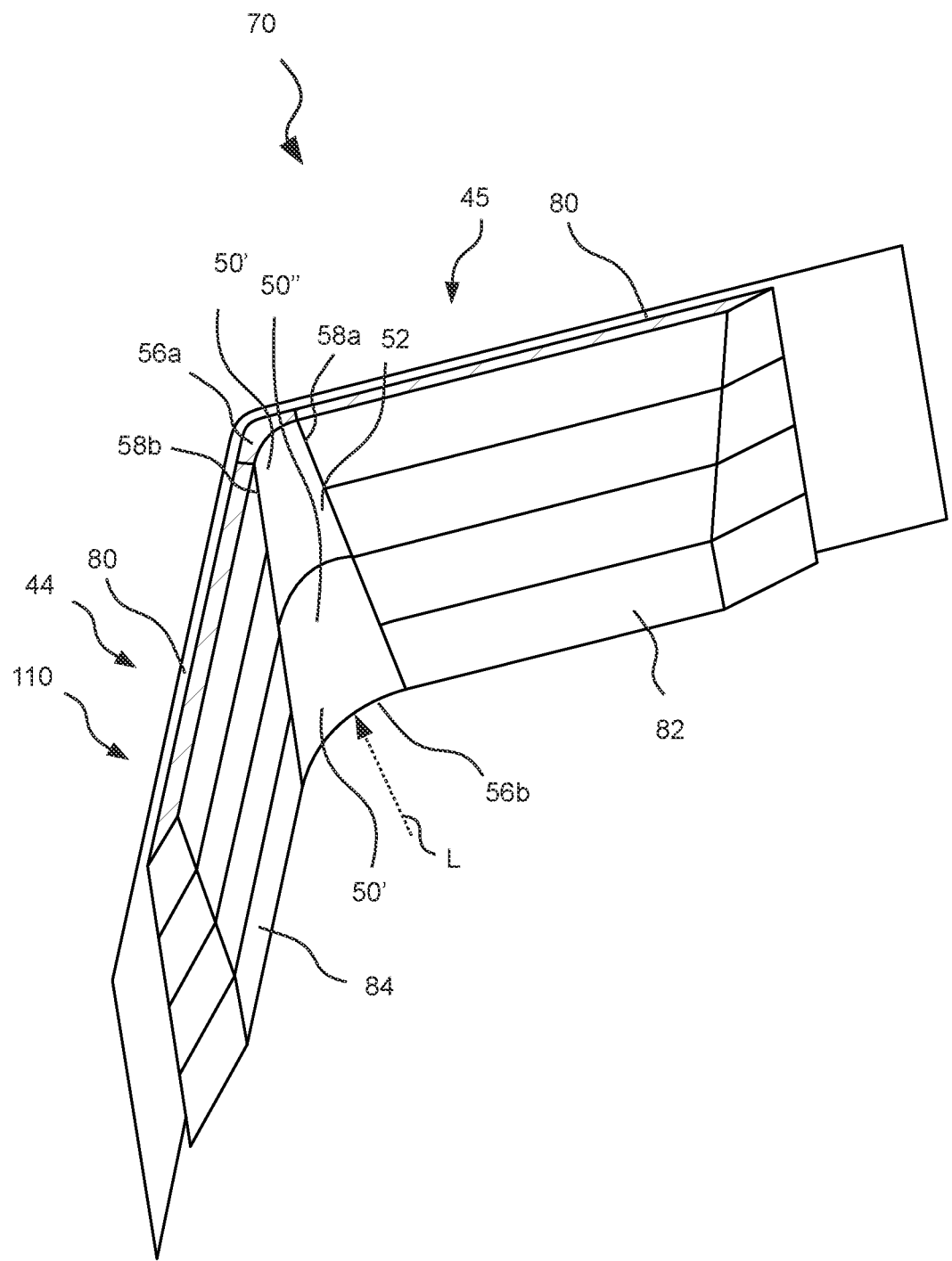
FIG. 9 is a schematic diagram illustrating an exemplary blade shell section of a wind turbine blade.

FIG. 9 is a schematic diagram illustrating an exemplary blade shell section of a wind turbine blade, such as a blade shell section of the wind turbine blade 10 of FIGS. 3-4. The wind turbine blade part comprises a profiled contour shell section 45 which may constitute part of the second blade shell part 26 and a flatback shell section 44. The profiled contour shell section 45 and the flatback shell section 44 may constitute part of the second blade shell 26 and/or the second blade component 92. Alternatively, the profiled contour shell section 45 and the flatback shell section 44 may constitute part of the first blade shell 24 and/or the first blade component 90. The profiled contour shell section 45 and the flatback shell section 44 comprises sandwich shell structure comprising a first laminate layer 80 and a core layer and a second laminate layer 86. The core layer comprises a first core element 82, a corner core element 50 and a second core element 84.

The corner core element 50 may be arranged in a wind turbine blade such that the first longitudinal end 56*a* is proximal the root of the wind turbine blade and the second longitudinal end 56*b* is proximal the tip of the wind turbine blade.

The corner core element 50 may comprise a plurality of parts, such as a first part 50' and a second part 50". The first part 50' and the second part 50" may be arranged in series along the longitudinal axis L.

The first corner lateral face height and the second corner lateral face height for the corner core element in FIGS. 5-9 should not be interpreted to be limiting to only as illustrated. For example, the first corner lateral face height may be larger than the second corner lateral face height or the heights may be the same.

Although not illustrated, the blade shell section 70 may comprise only one core element, such as only a core element in the profiled contour shell section 45 or only a core element in the flatback shell section 44.

LIST OF REFERENCES 2 wind turbine
4 tower
6 nacelle
8 hub
10 blade
12 blade part
14 blade tip
15 tip end
16 blade root
17 root end
18 leading edge
20 trailing edge
24 first blade shell part (pressure side, upwind)
25 leading part of pressure side
26 second blade shell part (suction side, downwind)
27 leading part of suction side
28 bond lines/glue joints
30 root region
32 transition region
34 airfoil region
38 chord
40 shoulder
42 shear web or spar side
44 flatback shell section
45 profiled contour shell section
46 first shell position
48 second shell position
50 corner core element 50' first part of corner core element
50" second part of corner core element
52 first corner main surface
54 second corner main surface
56a first longitudinal end
56b second longitudinal end
58a first corner lateral face
58b second corner lateral face
60 first corner lateral face height
62 second corner lateral face height
70 blade shell section
74 first spar cap
76 second spar cap
80 first laminate layer
82 first core element
83a first primary core surface
83b first secondary core surface
84 second core element
85a second primary core surface
85b second secondary core surface
86 second laminate layer
87 first secondary core lateral face
88 second primary core lateral face
90 first blade component
92 second blade component
100 first contact area
110 second contact area
T1 first corner lateral face height
T2 second corner lateral face height
P1 first position
P2 second position
P11 first shell section position
P12 second shell section position
L longitudinal axis
L1 first longitudinal position
L2 second longitudinal position
L3 third longitudinal position
r1 first radius of curvature
r2 second radius of curvature
r3 third radius of curvature

The invention claimed is:

1. A blade shell section of a wind turbine blade, the blade shell section extending in a longitudinal direction from a first shell section position to a second shell section position, the blade shell section comprising a first laminate layer forming the outer surface of the blade shell section and a second laminate layer forming the inner surface of the blade shell section,
the blade shell section further comprising:
a first shell section comprising a first core element having a first primary core surface and a first secondary core surface opposite the first primary core surface, a first primary core lateral face between the first primary core surface and the first secondary core surface and a first secondary core lateral face between the first primary and first secondary core surface laterally spaced from and opposite the first primary core lateral face;
a second shell section; and
a corner shell section between the first shell section and the second section, the corner shell section comprising a corner core element being an elongated element extending in a longitudinal direction between a first longitudinal end and a second longitudinal end and having:
a first corner main surface and a second corner main surface opposite the first corner main surface;
a first corner end face and a second corner end face opposite the first corner end face; and
a first corner lateral face between the first and the second corner main surface and a second corner lateral face between the first and second corner main surface laterally spaced from and opposite the first corner lateral face, the first corner lateral face having a first corner lateral face height, the second corner lateral face having a second corner lateral face height,
wherein the corner core element and the first core element being arranged such that the first corner lateral face abuts the first secondary core lateral face,
wherein the second corner main surface has a first radius of curvature at a first position proximate the first longitudinal end,
wherein the second corner main surface has a second radius of curvature at a second position proximate the second longitudinal end, and
wherein the first radius of curvature is larger than the second radius of curvature.

2. The blade shell section according to claim 1, wherein the corner core element and the first core element are made of a core material.

3. The blade shell section according to claim 1, wherein the first corner main surface has a concave shape and the second corner main surface has a convex shape.

4. The blade shell section according to claim 1, further comprising a second core element having a second primary core surface and a second secondary core surface opposite the second primary core surface, a second primary core lateral face between the second primary core surface and the second secondary core surface and a second secondary core lateral face between the second primary and second secondary core surface laterally spaced from and opposite the second primary core lateral face,
wherein the corner core element and the second core element are arranged such that the second corner lateral face abuts the second primary core lateral face.

5. The blade shell section according to claim 1, wherein the first core element and a second core element are fixated to the corner core element, wherein fixating the first core element and the second core element to the corner core element comprises fixating mechanically or chemically.

6. The blade shell section according to claim 1, wherein the first shell section forms part of a profiled contour shell section and wherein the second shell section form part of a flatback shell section.

7. The blade shell section according to claim 1, wherein the first corner lateral face height of the first corner lateral face is between 5-100 mm.

8. The blade shell section according to claim 1, wherein the second corner lateral face height of the second corner lateral face is between 5-100 mm.

9. The blade shell section according to claim 1, further comprising a plurality of corner core parts arranged in series in the longitudinal direction of the corner core element.

10. The blade shell section according to claim 1, wherein the first corner main surface of the corner core element is flush with the first primary core surface of the first core element and a second primary core surface of the second core element, and wherein the second corner main surface of the corner core element is flush with a first secondary core surface of the first core element and a second secondary core surface of the second core element.

11. The blade shell section according to claim 1, wherein the first shell section and/or the second shell section and/or the corner shell section is sandwiched between the first laminate layer and the second laminate layer.

12. A blade shell part extending from a root end to a tip end along a longitudinal axis and comprising a root region, a transition region, and an airfoil region, the blade shell part comprising a sandwich structure comprising an inner laminate, a core, and an outer laminate, the blade shell part further comprising:

the blade shell section according to claim 1, wherein the distance between the first shell section end and the second shell section end constitutes 20-60% of the length of the blade shell part, and wherein the blade shell section is arranged proximate the root region of the blade shell part.

13. The blade shell part according to claim 12, wherein the blade shell section is arranged such that the first longitudinal end is proximate the root end of the blade shell part and the second longitudinal end is proximate the tip end of the blade shell part.

14. A wind turbine blade extending from a root end to a tip end along a longitudinal axis and comprising a root region, a transition region, and an airfoil region, the wind turbine blade comprising a sandwich structure comprising an inner laminate, a core, and an outer laminate, the wind turbine blade further comprising:

a first blade shell part; and a second blade shell part, wherein the first and second blade shell parts are joined along a leading edge joint and along a trailing edge joint, and wherein the first blade shell part or the second blade shell part comprises the blade shell section according to claim 1.

15. The wind turbine blade according to claim 14, wherein the distance between the first shell section end and the second shell section end constitutes 20-60% of the length of the wind turbine blade, and wherein the blade shell section is arranged proximate the root region of the wind turbine blade.

16. The wind turbine blade according to claim 14, wherein the blade shell section is arranged such that the first longitudinal end is proximate the root end of the wind turbine blade and the second longitudinal end is proximate the tip end of the wind turbine blade.

* * * * *